(12) United States Patent
Battistello et al.

(10) Patent No.: US 9,992,016 B2
(45) Date of Patent: Jun. 5, 2018

(54) MESSAGE GENERATION FOR A CRYPTOGRAPHIC KEY GENERATION TEST

(71) Applicant: OBERTHUR TECHNOLOGIES, Colombes (FR)

(72) Inventors: Alberto Battistello, Colombes (FR); Christophe Giraud, Colombes (FR); Guillaume Dabosville, Colombes (FR); Laurie Genelle, Colombes (FR)

(73) Assignee: IDEMIA FRANCE, Colombes (FR)

( * ) Notice: Subject to any disclaimer, the term of this patent is extended or adjusted under 35 U.S.C. 154(b) by 81 days.

(21) Appl. No.: 15/122,822

(22) PCT Filed: Mar. 3, 2015

(86) PCT No.: PCT/FR2015/050513
§ 371 (c)(1),
(2) Date: Aug. 31, 2016

(87) PCT Pub. No.: WO2015/132524
PCT Pub. Date: Sep. 11, 2015

(65) Prior Publication Data
US 2017/0078089 A1 Mar. 16, 2017

(30) Foreign Application Priority Data
Mar. 6, 2014 (FR) .................................. 14 51813

(51) Int. Cl.
*H04L 9/14* (2006.01)
*H04L 9/08* (2006.01)
(Continued)

(52) U.S. Cl.
CPC ................ *H04L 9/08* (2013.01); *H04L 9/004* (2013.01); *H04L 9/302* (2013.01)

(58) Field of Classification Search
CPC ..... H04L 9/004; H04L 9/302; H04L 2209/26; H04L 9/08
See application file for complete search history.

(56) References Cited

U.S. PATENT DOCUMENTS 6,574,611 B1 * 6/2003 Matsuyama ............ G06F 21/10
380/30
7,113,595 B2 * 9/2006 Joye ......................... G06F 7/72
380/268
(Continued)

OTHER PUBLICATIONS

Evans, Donald L., et al: "FIPS PUB 140-2 Change Notices (Dec. 3, 2002) Security Requirements for Cryptographic Modules Category: Computer Security Subcategory: Cryptography", Mar. 12, 2002 (Mar. 12, 2002), XP055142285, Retrieved from the Internet: URL:http://csrc.nist.gov/publications/fips/fips140-2/fips1402.pdf [retrieved on Sep. 24, 2014].
(Continued)

*Primary Examiner* — Sharon Lynch
(74) *Attorney, Agent, or Firm* — Young & Thompson

(57) ABSTRACT

Generation of a message m of order λ(n) for a test of the integrity of the generation of a pair of cryptographic keys within the multiplicative group of integers modulo n=p·q, including: —key pair generation including, to generate p and q: a random selection of candidate integers; and a primality test; —a first search of the multiplicative group of integers modulo p for a generator a; —a second search of the multiplicative group of integers modulo q for a generator b; —a third search for a number y, as message m, verifying: $1 \le y \le n-1$, where $y=a \bmod p$ and $y=b \bmod q$, the first or second search being performed during the primality test.

7 Claims, 3 Drawing Sheets

(51) Int. Cl.
  *H04L 9/00* (2006.01)
  *H04L 9/30* (2006.01)

(56) References Cited

U.S. PATENT DOCUMENTS

| | | | | |
|---|---|---|---|---|
| 9,654,290 | B2* | 5/2017 | Battistello | H04L 9/14 |
| 2001/0036267 | A1* | 11/2001 | Paillier | H04L 9/3013 |
| | | | | 380/44 |
| 2004/0028223 | A1* | 2/2004 | Joye | G06F 7/72 |
| | | | | 380/30 |
| 2005/0078821 | A1* | 4/2005 | Jin | G06F 7/723 |
| | | | | 380/46 |
| 2006/0050868 | A1* | 3/2006 | Bockes | G06F 7/723 |
| | | | | 380/28 |
| 2013/0208886 | A1* | 8/2013 | Lee | H04L 9/28 |
| | | | | 380/28 |
| 2014/0013102 | A1* | 1/2014 | Dottax | H04L 9/302 |
| | | | | 713/150 |
| 2015/0172052 | A1* | 6/2015 | Battistello | H04L 9/002 |
| | | | | 380/28 |

OTHER PUBLICATIONS

Joye, Marc: "Protecting RSA against Fault Attacks: The Embedding Method", Fault Diagnosis and Tolerance in Cryptography (FDTC), 2009 Workshop on, IEEE, Piscataway, NJ, USA, Sep. 6, 2009 (Sep. 6, 2009), pp. 41-45, XP031627635, ISBN: 978-1-4244-4972-9.
International Search Report, dated Oct. 20, 2015, from corresponding PCT Application.

* cited by examiner

MESSAGE GENERATION FOR A CRYPTOGRAPHIC KEY GENERATION TEST

The present invention concerns the field of computer security. It more particularly concerns the security of cryptographic methods employing pairs of public and private keys.

Some cryptographic systems employing methods such as the digital signing or encryption of a message, for example, require the generation of pairs of cryptographic keys.

The cryptographic system shares the public key in clear with the systems intended to receive the processed message whereas the private key is kept secret.

The generation of the pairs of public and private keys being a sensitive operation, test mechanisms are usually provided for verifying their integrity.

For example, the American standard FIPS 140-2 published by the NIST (National Institute of Standards and Technology) provides such a test (known as a pair-wise consistency test).

In the case of cryptographic methods of RSA (Rivest Shamir Adelman) type, the pair of keys is obtained in the following manner.

To obtain p and q, two large prime numbers, the following two steps are repeated:
- obtaining two candidate numbers p and q from numbers drawn at random in the set $Z_n$ of the multiplicative group of integers modulo n, and
- testing the primality of the candidates p and q (for example in accordance with a probabilistic primality test, which may be of Miller-Rabin type, in accordance with the FIPS 140-2 standard), until a prime number is obtained.

The product of the numbers p and q thus forms a number n (n=p·q).

Then the number $\Phi(n)=(p-1)\cdot(q-1)$ is calculated ($\Phi$ being the Euler indicator function or totient).

The public key is then formed by the numbers n and e, with e, the "public exponent", being an integer such that:
1<e<$\Phi(n)$, and
e and $\Phi(n)$ are mutually prime (gcd(e, $\Phi(n)$)=1, gcd being the greatest common divisor.

For its part, the private key is formed by the numbers n and d, with d, the "private exponent", being an integer such that:
d·e=1 mod $\lambda(n)$, with
$\lambda(n)$ being the lowest common multiple between p−1 and q−1 ($\lambda(n)$=1 cm(p−1, q−1), 1 cm being the least common multiple.

When the cryptographic method encrypts a message m (m belonging to $Z_n$), the integrity test provided by the FIPS 140-2 standard may be summarized as follows:
1) the message m is encrypted with the public key so as to obtain an encrypted message c=$m^e$ mod n,
2) the encrypted message c is decrypted with the private key so as to obtain a decrypted message m'=$c^d$ mod n, and
3) it is verified that the initial message m and the decrypted message are the same (m'=m).

When the cryptographic method signs a message m (m belonging to $Z_n$), the integrity test provided by the FIPS 140-2 standard may be summarized as follows:
1) the message m is signed with the private key so as to obtain a signature s=$(m)^d$ mod n, (or possibly s=$(H(m))^d$, H being a hashing function,
2) a value h'=$s^e$ mod n is calculated, and
3) it is verified that the value h' thus calculated and the message m are the same (or possibly that the value h' and the condensate of the message by the hashing function are the same (h'=H(m)).

The inventors have nevertheless noted that the integrity tests currently used might not detect some key pair generation errors.

They have therefore shown up a requirement to include the reliability of the methods of verifying the integrity of the generation of pairs of keys in cryptographic systems.

The present invention falls within this framework.

A first aspect of the invention concerns a method of generating a message m of order $\lambda(n)$, $\lambda(n)$ being the lowest common multiple between p−1 and q−1, p and q being two prime numbers, for its use in a test of the integrity of generation of a pair of public and private cryptographic keys in the multiplicative group of integers modulo n, with n being the product of the two prime numbers p and q, the method including:
- a step of generation of said pair of public and private cryptographic keys, said step including, for generating the numbers p and q:
  - a random drawing (200, 202) of candidate integers, and
  - a test (201, 203) of the primality of said candidate integers,
- a first step (304) of searching for a generator a of the multiplicative group of integers modulo p, zero being excluded,
- a second step (304) of searching for a generator b of the multiplicative group of integers modulo q, zero being excluded,
- a third step (205) of searching for a number γ, as message m, verifying: 1≤γ≤n−1 with γ=a mod p and γ=b mod q, characterized in that at least one of said first and second search steps is executed during said primality test.

A method in accordance with the first aspect makes it possible to generate messages rendering the key pair generation integrity tests more robust.

In particular, a method in accordance with the first aspect makes it possible to generate messages the order whereof makes it possible to detect key pair generation anomalies more easily.

For example, said test includes the following steps:
- determining a candidate integer w verifying w−1=$2^s$r, s being an integer and r being an odd integer,
- selecting a candidate generator c such that 1≤c≤w−1,
- calculating the number y=$C^{2^{s-1}r}$, and
- comparing said number y with the number w−1, and
- selecting said number c as generator of the multiplicative group of integers modulo w, zero being excluded, if y≡w−1 mod w.

For example, s is the number of less significant bits (at 0) of w−1.

For example, s is the greatest power of 2 that divides w−1.

The method may further include a test step to verify if $a^{(w-1)/q}\neq 1$ mod w, with $a^{w-1}=1$ mod w, said verification being effected for a set of divisors q of w−1.

For example, said verification is effected for a set of prime divisors q of w−1.

For example, for said divisors q, the value $a^{(w-1)/q}$ is calculated by modular exponentiation.

The method may further include an initialization of said modular exponentiation with an initial variable calculated from the factorization in prime numbers of the number w−1.

For example, said test is carried out in accordance with a probabilistic algorithm.

A second aspect of the invention concerns a method of testing the security of an electronic device against an attack, said device employing generation of a public cryptographic key e and a private cryptographic key d in the multiplicative group of integers modulo n, such that:

n=p·q, with p and q being prime numbers, $1 < e < \Phi(n)$, with e and $\Phi(n)$ being mutually prime and $\Phi(n)=(p-1)·(q-1)$, and d·e=1 mod $\lambda(n)$, $\lambda(n)$ being the lowest common multiple between p−1 and q−1.

The method comprises a step of obtaining a value $\lambda'(n)=\lambda(n)/\alpha$, instead of a value $\lambda(n)$, with $\alpha$ dividing $\lambda(n)$, a private key d' being thus calculated instead of the private key d such that d'·e=1 mod $\lambda(n)/\alpha$.

A method in accordance with the second aspect makes it possible to test electronic devices employing generation of pairs of keys by verifying their reaction to the disturbance of the calculation of the lowest common multiple.

A method in accordance with the second aspect may be employed in the industrial process of testing electronic devices employing generation of cryptographic keys, for example in a test laboratory. Said perturbation step can make it possible to identify a vulnerability in resistance to erroneous calculation of the value $\lambda(n)$.

For example, the value $\lambda'(n)$ is calculated on a third party device and supplied to the device under test.

For example, the value $\lambda'(n)$ is calculated on the device under test and obtained by disturbance of the calculation of the value $\lambda(n)$.

A third aspect of the invention concerns a computer program as well as a computer program product and a storage medium for such programs and product, making possible the implementation of a method in accordance with the first or second aspect when the program is loaded and executed by a processor of an electronic device, for example a cryptographic device.

A fourth aspect concerns an electronic device, for example a cryptographic device, configured to implement a method in accordance with the first or second aspect.

For example, a device in accordance with the fourth aspect is a portable electronic entity.

The device in accordance with the third aspect may be a smartcard.

Other types of devices may be envisaged, notably security documents (electronic passport, electronic identity card, etc.), USB keys, mobile telephones and smartphones.

Other advantages, objects and features of the present invention emerge from the following detailed description given by way of nonlimiting example with reference to the appended drawings, in which.

Embodiments are described hereinafter. However, in a preliminary manner, there is described a cryptographic key pair generation integrity test method. This test method may be used for cryptographic keys used in encryption and/or digital signature mechanisms. This method may therefore be used even before the subsequent use of the pair of keys generated is known.

It is assumed that a public cryptographic key (e, n) and a private cryptographic key (d, n) are generated such that:

n=p·q, with p and q being prime numbers, $1 < e < \Phi(n)$ and e and $\Phi(n)$ are mutually prime (gcd(e, $\Phi(n)$)=1), with $\Phi(n)=(p-1)·(q-1)$ ($\Phi$ being the Euler indicator function or totient), and d·e=1 mod $\lambda(n)$, $\lambda(n)$ being the lowest common multiple between p−1 and q−1 ($\lambda(n)=1$ cm(p−1, q−1)).

Figure 1:
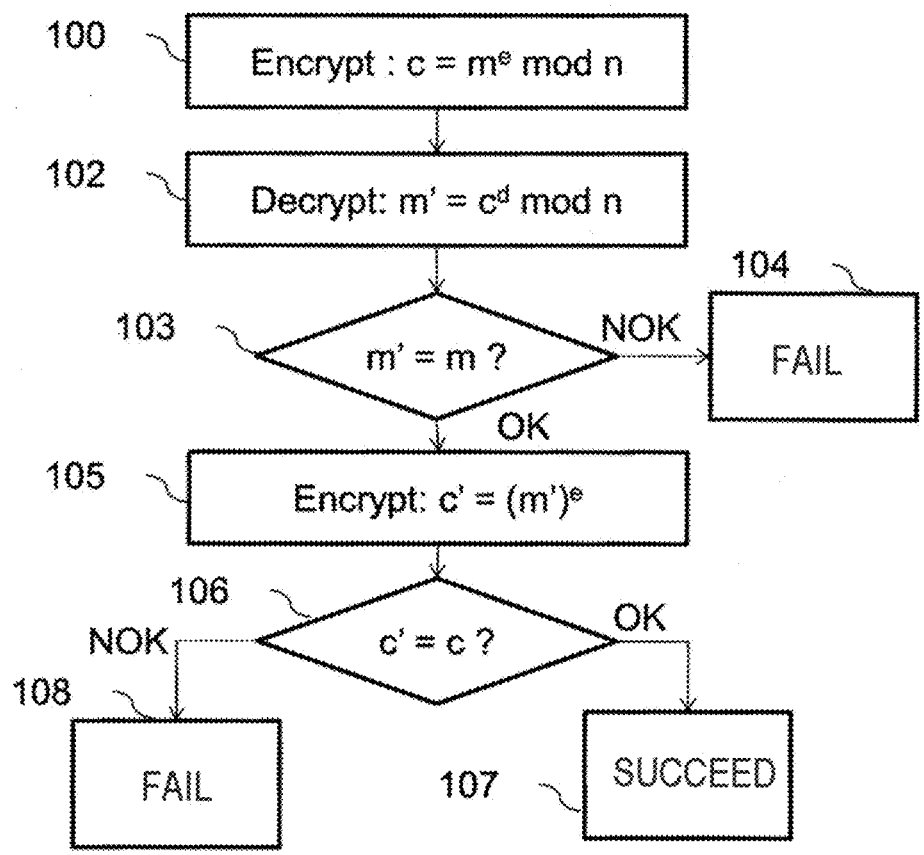
FIG. 1 illustrates a key generation integrity test.

Then, as shown in FIG. 1, during a first step 100 a message m (m belonging to $Z_n$, the multiplicative group of integers modulo n), is encrypted with the public exponent e so as to obtain a first encrypted message c=$m^e$ mod n. Then, during the step 102, the encrypted message c is decrypted with the private key d so as to obtain a decrypted message m'=$c^d$ mod n.

It is then verified during a step 103 if the initial message m and the decrypted message are the same (m'=m). If this is not the case (NOK), it is determined during the step 104 that the generated key pair has no integrity. If on the other hand the initial message m and the decrypted message are the same (OK), the decrypted message m' is encrypted, during a step 105, with the public exponent e so as to obtain a second encrypted message c'=$(m')^e$ mod n.

It is then verified during a step 106 if the first encrypted message c and the second encrypted message c' are the same (c'=c). If such is the case (OK), it is determined during the step 107 that the integrity test has succeeded. If not (NOK), it is determined during the step 108 that the generated key pair has no integrity.

Some key pairs with no integrity may successfully pass integrity tests like that described above or other prior art tests.

For example, if, instead of generating the private exponent d, a number d' is generated such that:

d'·e=1 mod $\lambda(n)/\alpha$, $1 \leq \alpha$, $\alpha$ divides $\lambda(n)$, it can happen that for messages the pair of keys with the numbers d' and e successfully passes the test but an error has occurred in the private exponent d.

In addition to being a source of errors for a cryptographic system using the keys, this can be a source of attacks by malicious third parties.

For example, the number d' may be generated in error if the calculation of the lowest common multiple of p−1 and q−1 (which should normally give $\lambda(n)$) is erroneous. The number d' may be calculated using the Euclid algorithm. The integers a and b are calculated so that e·a+b·$\lambda(n)/\alpha$=1 (Bezout's identity). The number d' is then obtained as d'=a mod $\lambda(n)/\alpha$. Under these conditions, it is indeed the fact that d'·e=1 mod $\lambda(n)/\alpha$.

By causing the determination of the number d' instead of the number d, a hacker can therefore retrieve one of the secret factors (p and q) of the number n such that n=p·q.

In fact, assuming that the integer $\alpha$ divides the number $$\frac{(q-1)}{gcd(p-1, q-1)}$$

but not the number then $$\frac{(p-1)}{gcd(p-1, q-1)},$$

then denoting by t the number such that $$t = \frac{(q-1)}{\alpha \cdot \gcd(p-1, q-1)},$$

we obtain $d=e^{-1} \bmod t \cdot (p-1)$.

Therefore, the private exponent is the inverse of the public exponent in the ring $Z_{t \cdot (p-1)}$ instead of the ring $Z_{\lambda(n)}$. Then, for a random message m:

$(m^d)^e = m \bmod n$, and also $(m^d)^e = m \bmod p$.

A multiple of the factor p can therefore be obtained as $(m^d)^e - m \bmod n$.

A hacker can therefore interfere with the generation of keys and request the signing of random messages. For some messages m, the signature s obtained is such that $\gcd(s^e - m, n)$ gives a factor of n.

Assume that the lowest common multiple of p−1 and q−1 is calculated as follows:

$$\lambda(n) = \frac{(p-1) \cdot (q-1)}{\gcd(p-1, q-1)},$$

with gcd(p−1, q−1) being the greatest common divisor of p−1 and q−1. If the calculation of this greatest common divisor gives α·gcd(p−1, q−1) (the product of α by gcd(p−1, q−1)) instead of gcd(p−1, q−1), d' is calculated instead of calculating d.

The inventors have noted that the integrity tests currently used could fail to detect some key pair generation errors, notably during attacks as referred to above.

A hacker can cause errors in the calculation of the private exponent by auxiliary channel observation of the operation of the device executing the key generation and then by physically attacking the device to interfere with this operation. The hacker can for example use lasers to interfere with the device or to interfere with its electrical power supply.

By way of illustration, if an error α (as referred to above) is introduced such that the number α divides the value k·λ(n)/α (k being an integer) and such that instead of the number d a number d' is determined such that d'·e=1+k·λ(n)/α then an integrity test as defined for example in the FIPS 140-2 standard executed on a message m of order s does not make it possible to detect the error if s divides k·λ(n)/α but does make it possible to detect it if s does not divide k·λ(n)/α. It must be remembered that the order s of the message m in the multiplicative group is the number of times that the message m must be multiplied to obtain 1.

In fact, let e, p and q be RSA parameters with n=p·q. If $d'=e^{-1} \bmod \lambda(n)/\alpha$ is the erroneous exponent, the correct exponent being $d=e^{-1} \bmod \lambda(n)$, if d' is different from d then $\exists m \in Z_n^*$ such that $(m^e)^{d'} \neq m \bmod n$. Moreover if $\forall m \in Z_n^*$ we have $(m^e)^{d'} = m \bmod n$ then d=d'. It is possible to demonstrate this, but in the interests of conciseness this is not done here.

Methods are described hereinafter making it possible to render the integrity tests sensitive to this type of errors. The integrity tests may be employed during generation of the keys.

As discussed above with reference to FIG. 1, the detection of an erroneous key is sensitive to the value of the order of the message m used for the test. If the order s of the message m divides k·λ(n)/α (k is an integer and α divides λ(n)) the error is not detected.

It is then advantageous to generate messages the order of which makes it possible to detect the error, in particular messages the order of which does not divide k·λ(n)/α.

For example, messages of order λ(n) are good candidates.

There is described hereinafter with reference to FIG. 2 a method of generation of messages of order λ(n) for use in integrity test methods. This method is based on the algorithm described by Menenzes et al. in "*Handbook of Applied Cryptography*" (method 4.83 in that document).

During a step 200, a number p is generated at random. It is then verified during the step 201 whether the number p is prime. If this is not the case (NOK), the step 200 is repeated. If p is prime (OK), a number q is generated at random during the step 202. It is thereafter verified during the step 203 whether the number q is prime. If this is not the case (NOK), the step 202 is repeated. If q is prime (OK), the product n of the numbers p and q (n=p·q) is calculated during the step 204.

During the primality tests, the generators a and b of the additive groups $Z_p^*$ of integers modulo p (0 being excluded) and $Z_q^*$ of the integer modulo q (0 being excluded) are calculated.

For example, the generator a is calculated during the primality test for the integer p and the generator b is calculated for the integer q.

A number γ is then calculated during the step 205, such that 1≤γ≤n−1 with γ=a mod p and γ=b mod q.

The number γ calculated in this way is then utilized (step 206) as the message for the integrity test of the cryptographic keys generated from p and q.

To calculate the integer number γ, the Gauss algorithm (2.121 in the above-mentioned document) may be used.

The cryptographic keys may be generated in a process (not shown) during which the public key is generated with the calculation of the public exponent e such that:
1<e<Φ(n) and
e and Φ(n) are mutually prime (gcd(e, Φ(n))=1), with Φ(n)=(p−1)·(q−1) (Φ being the Euler indicator function or totient).

During this process, the private key may be generated with the calculation of the number d such that d·e=1 mod λ(n), λ(n) being the lowest common multiple in p−1 and q−1.

The search for the generators a and b as proposed in the prior art, in particular in the above-mentioned document, necessitates the factorization of the integers p−1 and q−1. Now, in cryptographic applications, the integers p and q are generally strong integer numbers, i.e. the integers p−1 and q−1 each have a large divisor (for example of the order of 160 bits). For example, in the FIPS 180-3 and ANSI X9.31 standards p and q are generated such that p−1, p+1, q−1 and q+1 are divisible by a large prime number.

It is therefore somewhat unrealistic to use the prior art methods.

It is proposed here that it is advantageous to determine these integers during the primality test effected during the generation of the integers p and q. It is therefore possible to find the generators a and b knowing that the integers p and q are strong prime numbers.

As already referred to above, the primality test may for example be a probabilistic test (for example of the Miller-Rabin type).

The method described with reference to FIG. 3 may be used to calculate the generator(s) a and/or b.

In a first step 300, a candidate integer w, verifying $w-1=2^s r-1$ is generated.

An integer c is then selected in the step 301 such that $1 \leq c \leq w-1$. A number $y=C^{2^{s-1} \cdot r}$ is calculated from this integer during the step 302.

Then, if this number y is equal to w−1 modulo w (test of the step 303), this number is chosen as generator of the multiplicative group $Z_w^*$ of integers modulo w (0 being excluded). This may therefore be the number α for the multiplicative group $Z_p^*$ and/or the number b for the multiplicative group $Z_q^*$.

An algorithm for generating the generators a and b is given in appendix A. It is based on the Miller-Rabin algorithm. The algorithm illustrates the search for the generator a, the latter being transposable to the search for the generator b.

A variable y is initialized with the value $a^r$ mod w. The value $a^{2^j r}$ mod w is then calculated iteratively by squaring the variable y in each step j, with $0 \leq j \leq s-1$.

If the iterative loop terminates with j=s−1 and y=w−1, then the base a is probably a generator of the multiplicative group $Z_w^*$ of integers modulo w (0 being excluded).

The algorithm given in appendix A can deliver a plurality of generators but is designed so that it always returns the last one.

The multiplicative group $Z_p^*$ of integers modulo p (0 being excluded) has a number $\Phi(\Phi(p))$ of generators ($\Phi$ being the Euler indicator function or totient). The probability for the algorithm to return a generator of $Z_p^*$ (p being prime) is $\Phi(\Phi(p))/\Phi(p)$, i.e. $\Phi(p-1)/(p-1)$. The iterative loop being repeated t times, the probability of finding a generator among the t random executions is t. $\Phi(p-1)/(p-1)$.

The generator search algorithm can return "false positives", i.e. elements of the multiplicative group $Z_w^*$ of integers modulo w (0 being excluded) that are not in fact generators. However, as soon as α=2 (it must be remembered that a is a divisor of λ(n) and that the search is for messages the order whereof does not divide k·λ(n)/α), these "false" generators can be used anyway to detect the erroneous exponents d'.

In fact, let us assume:

that $g_p$ is a generator of the subgroup G included in the multiplicative group $Z_p^*$ of integers modulo p (0 being excluded) of order $o(g_p)=2^s \cdot p_1^{e_1} \ldots p_i^{e'_i} \ldots p_t^{e_t}$, avec e'$_i$<e$_i$ but not a generator of $Z_p^*$ that $g_q$ is a generator of the subgroup G' included in the multiplicative group $Z_q^*$ of integers modulo q (0 being excluded) of order $o(g_p)=q-1=2^r \cdot p_1^{f_1} \ldots p_j^{f_j} \ldots p_t^{f_t 2}$, whilst not being a generator of $Z_q^*$ and that g is the gaussian recombination of $g_p$ and $g_q$, which is an element of $Z_n^*$ of order lcm ($o(g_p), o(g_q)$).

By definition we have:

$$\lambda(n) = lcm(p-1, q-1)$$
$$= \frac{(p-1) \cdot (q-1)}{gcd(p-1, q-1)}$$
$$= 2^s \cdot p_1^{e_1} \ldots p_t^{e_t} \cdot 2^{r-m_0} \cdot p_1^{f_1-m_1} \ldots p_t^{f_t-m_t}$$

with $m_j=min (e_j, f_j)$ for j=1 . . . t and $m_0=min (r, s)$.

We also have:

$$o(g) = lcm(o(g_p), o(g_q))$$

-continued
$$= 2^s \cdot p_1^{e_1} \ldots p_i^{e'_i} \ldots p_t^{e_t} \cdot 2^{r-m_0} \cdot p_1^{f_1-m_1} \cdot p_i^{f_i-m'_i} \cdot p_j^{f_j-m'_j} \ldots p_t^{f_t-m_t}$$

with m'$_i$=min (e'$_i$, f$_i$) less than or equal to m$_i$ and m'$_j$=min (e$_j$, f$_j$) less than or equal to m$_j$ and i less than or equal to j[3].

The effect of the primality test ($g^{ed'}=g$ mod n) on such an element g is considered hereinafter.

By virtue of the definition of the erroneous exponent d', we have: $e \cdot d' = 1 + k \cdot \lambda(n)/\alpha$.

If d' is different from d (otherwise d' would be a correct exponent), α does not divide k, therefore α divides λ(n). If α=2, then $$\frac{\lambda(n)}{\alpha} = 2^{s-1} \cdot p_1^{e_1} \ldots p_t^{e_t} \cdot 2^{r-m_0} \cdot p_1^{f_1-m_1} \ldots p_t^{f_t-m_i}$$

and therefore $$g^{k\frac{\lambda(n)}{\alpha}} \neq 1$$

because the order o(g) of g does not divide λ(n)/α.

In fact, we have $$\frac{\lambda(n)/\alpha}{o(g)} = 2^{-1} \cdot p_i^{e_i-e'_i} \cdot p_i^{m'_i-m_i} \notin N$$

which in the end implies that $g^{ed'}$ is different from g modulo n. This means that the primality test rejects the generated key, which will be considered as erroneous.

In the situation α=2 it is therefore possible to use the generators stemming from false positives of the algorithm described above. In fact, this can be generalized for other values of α, for example, in the set (2, 3, 5, 7).

An algorithm, also based on the Miller-Rabin algorithm, utilizing such values of α is therefore given in appendix B. The algorithm given in appendix B utilizes the following property (property 4.38 in the documents cited above).

If w is an integer greater than or equal to 3, then w is a prime number if and only if there exits an integer satisfying:
(i) $a^{w-1}=1$ mod w and
(ii) $a^{(w-1)/q} \neq 1$ mod w for any prime divisor q of w−1.

The appendix B algorithm is similar to that of appendix A and adds the test of the above condition (ii).

The implicit factorization effected in line 19 and in the test of line 21 is described hereinafter.

The factorization of w−1 on the base T of small prime numbers less than B is an available method known in the prior art, for example in the document Granville, "*Smooth numbers: Computational number theory and beyond*", Proc. MSRI Conf. Algorithmic Number Theory: Lattices, Number, Fields, Curves and Cryptography, Berkeley 2000, Cambridge University Press.

For the test of line 21, instead of calculating and testing if $a^{(w-1)/q_i} \neq 1$ mod w for each divisor $q_i$ of w−1 there is rather a test whether $a^{(2^{s-1} \cdot r)/q_i} \neq 1$ mod w for each prime divisor $q_i$ of w−1. Account is therefore taken of the fact that $a^{(2^{s-1} \cdot r)}$ is not calculated in the Miller-Rabin algorithm.

For this same test, it is necessary to calculate $q_i^{th}$ modular roots for each prime integer $q_i$. This operation is relatively costly in terms of resources.

The algorithm given in appendix C makes it possible to transform a $q_i^{th}$ modular root calculation into a modular exponentiation by $q_i$. The intermediate value $$y_0 = a^{2^{s-1}} \cdot q_1^{u_1-1} \cdots q_m^{u_m-1} \cdot v$$

is calculated in line 2 which makes it possible to calculate more easily the values $a^{(2^{s-1} \cdot r)/q_i}$ as $$y_0^{\prod_{j \neq i} q_j} = a^{2^{s-1} \cdot q_1^{u_1} \cdots q_i^{u_i-1} \cdots q_m^{v_m} \cdot v} \bmod \omega$$

which includes only modular exponentiations of $y_0$ by a product of small prime integers.

In order to optimize the calculations when using the appendix C algorithm, the Miller-Rabin algorithm may be modified to calculate and to store the intermediate value $y_0$ to avoid calculating two costly exponentiations, namely $$y_0 = a^{2^{s-1}} \cdot q_1^{u_1-1} \cdots q_m^{u_m-1} \cdot v$$

and $$y_0 = a^{2^{s-1} \cdot r} = y_0 \pi_j^{q_j}.$$

A modified algorithm is given in appendix D. This algorithm yields an element g of the group $Z_w^*$ the partial factorization of which of the order (of the element g) on the base T is the same as the factorization of a generator of $Z_w^*$.

To summarize, the primality test used for the generation of the cryptographic keys is modified to make possible the generation of messages of maximum order in addition to the keys that make it possible to optimize the integrity verification. The keys are therefore correctly generated with a lower error rate because this strengthens the integrity tests.

Figure 4:
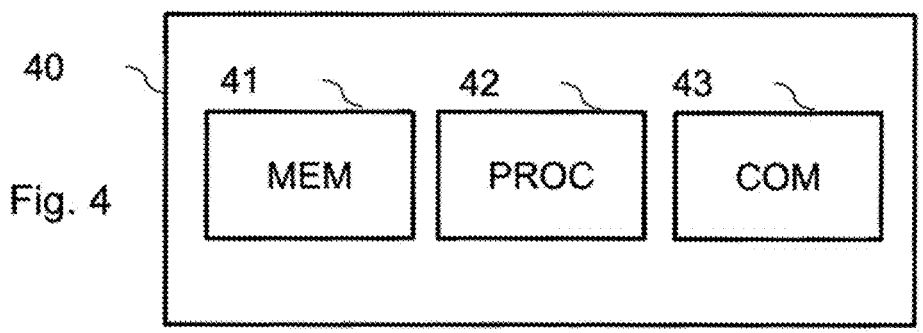
FIG. 4 illustrates diagrammatically embodiments of a device.
Figure 2:
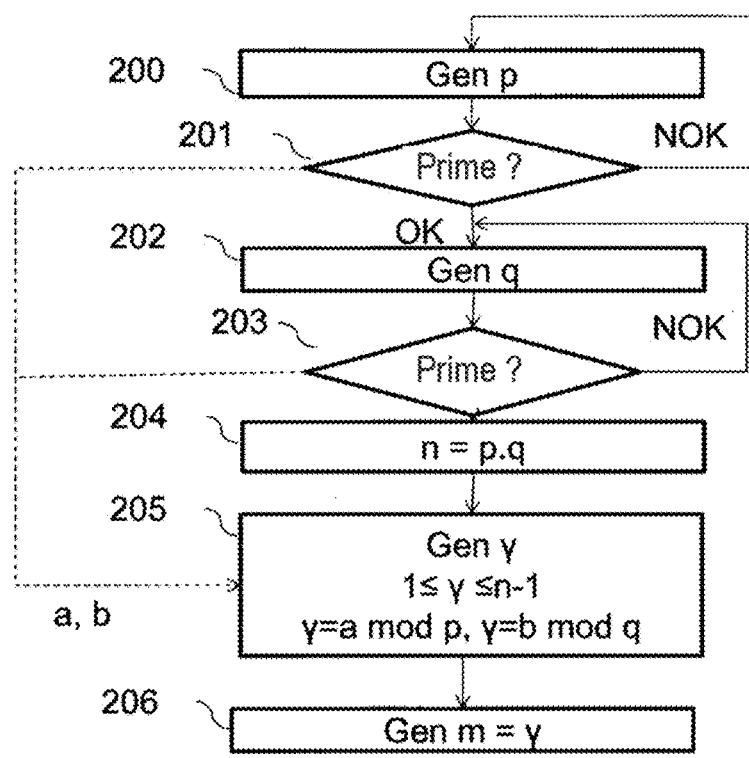
FIG. 2 illustrates a message generation method for a key generation integrity test.
Figure 3:
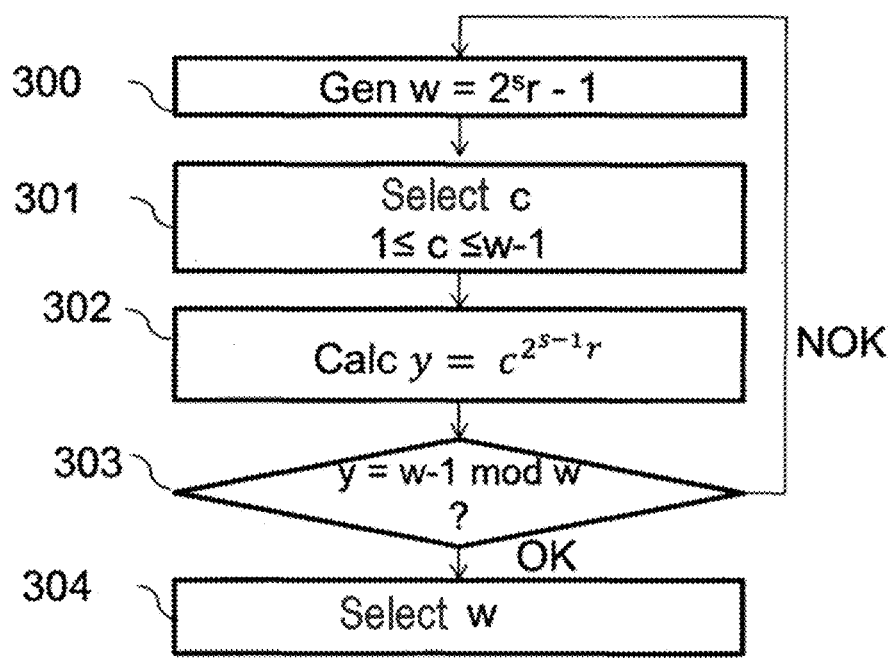
FIG. 3 illustrates a method of determination of a generator of a multiplicative group.

Computer programs for executing methods in accordance with embodiments of the invention can be produced by a person skilled in the art after examining FIGS. 1 to 3, appendices A to D and the present detailed description. FIG. 4 illustrates diagrammatically embodiments of a device.

The FIG. 4 device 40 includes a memory unit (MEM) 41. This memory unit includes a random-access memory for temporary storage of calculation data used during the execution of a method in accordance with diverse embodiments of the invention. The memory unit further includes a non-volatile memory (for example of the EEPROM type) to store a computer program, for example, in accordance with one embodiment, for its execution by a processor (not represented) of a processing unit (PROC) 41 of the device.

The device moreover includes a communication unit (COM) 43, for example for exchanging data with a device in accordance with other embodiments. Data may be exchanged between the devices using the APDU (Application Protocol Data Unit) protocol as defined in ISO standard 7816 part 4.

The communication unit can therefore include an input/output interface able to exchange data in accordance with this protocol. Data may be exchanged by means of APDU commands and responses to this type of commands.

A device in accordance with embodiments may conform to the ISO standard 7816. It may for example be a smartcard or a secured element.

A device in accordance with embodiments is for example an integrated circuit.

The present invention has been described and illustrated in the present detailed description with reference to the appended figures. The present invention is not limited to the embodiments described, however. Other variants, embodiments and combinations of features may be deduced and implemented by a person skilled in the art after reading the present description and examining the appended figures.

In the claims, the term "include" does not exclude other elements or other steps. The indefinite article "a" or "an" does not exclude the plural. A single processor or a plurality of other units may be used to implement the invention. The various features described and/or claimed may advantageously be combined. Their presence in the description or in different dependent claims does not in fact exclude the possibility of combining them. The reference signs should not be understood as limiting the scope of the invention.

Appendix A

Algorithm 1: Miller-Rabin probabilistic test modified to find a generator for $\alpha=2$ Input: the integer w under test, a security parameter t Output: a response "Prime" or "Composite" to the question: "is w prime?", and a generator g of $Z_w^*$ if w is prime.

```
1:  y ← 0
2:  g ← 0
3:  Write w − 1 = 2^s r such that r is odd
4:  for i = 1 to t do              ▷ t is a security parameter
5:      Pick randomly a in [2, w − 2]
6:      Compute y = a^r mod w
7:      if y ≠ 1 and y ≠ w − 1 then
8:          j ← 1
9:          while j ≤ s − 1 and y ≠ w − 1 do
10:             Compute y ← y^2 mod w
11:             if y = 1 then return (Composite)
12:             end if
13:             j ← j + 1
14:         end while
15:         if y ≠ w − 1 then return (Composite)
16:         end if
17:         if j = s − 1 then
18:             g ← a       ▷ a has an order equal to w − 1, keep it in g !
19:         end if
20:     end if
21: end for
22: return (Prime, g)
```

Appendix B

Algorithm 2: Miller-Rabin probabilistic test modified to find a generator for any $\alpha$ Input: the integer w under test, a security parameter t Output: a response "Prime" or "Composite" to the question: "is w prime?", and a generator g of $Z_w^*$ if w is prime.

```
1:  y ← 0
2:  g ← 0
3:  isAGenerator ← false
4:  Write w − 1 = 2^s r such that r is odd
5:  for i = 1 to t do              ▷ t is a security parameter
6:      Pick randomly a in [2, w − 2]
7:      Compute y = a^r mod w
8:      if y ≠ 1 and y ≠ w − 1 then
9:          j ← 1
10:         while j ≤ s − 1 and y ≠ w −1 do
11:             Compute y ← y^2 mod w
12:             if y = 1 then return (Composite)
13:             end if
14:             j ← j + 1
15:         end while
16:         if y ≠ w − 1 then return (Composite)
17:         end if
18:         if j = s − 1 then         ▷ a^{w−1} ≡ 1 mod w
19:             Let {q_1,... ,q_m} ⊂ T be the small prime divisors of w − 1
```

-continued

```
20:        for i = 1 to m do
21:            if a^((w-1)/q_i) ≢ 1 mod w then
22:                continue                    ▷ a^((w-1)/q_i) ≢ 1 mod w
23:            else
24:                isAGenerator ← false;
25:                break;                      ▷ Leave the For-loop
26:            end if
27:        end for
28:        if isAGenerator then
29:            g ← a
30:        end if
31:    end if
32:    end if
33: end for
34: return (Prime, g)
```

```
24:            continue
25:        else
26:            isAGenerator ← false;
27:            break;                          ▷ Leave the For-loop
28:        end if
29:    end for
30:    if isAGenerator then
31:        g ← a
32:    end if
33:    end if
34:   end if
35: end for
36: return (Prime, g)
```

Appendix C

Algorithm 3: test of generator on base T

Input: the element a under test as generator, the first candidate prime number w under Miller-Rabin test, a base $\{2, q_1, \ldots, q_m\}$ included in T for partial factorization.

Output: a response "isAGenerator" or "isNotAGenerator" to the question "is a generator of $Z_w^*$?"

```
1: Let w − 1 = 2^s · q_1^{u1} … q_m^{um} · v be the partial prime
   factorisation of w − 1 on basis T.
2: Compute y_0 ← a^{2^{s-1} · q_1^{u1-1} … q_m^{u_m-1} · v}
3: if y_0 ≢ −1 mod w then return isNotAGenerator
4: end if
5: for i = 1 to m do
6:     Compute y_i ← y_0^{∏_{j≠i} q_j} mod w
7:     if y_i ≡ −1 mod w then return isNotAGenerator
8:     end if
9: end for
10: return isAGenerator
```

Appendix D

Algorithm 4: Miller-Rabin probabilistic test optimized to find a generator for any α

Input: the integer w under test, a security parameter t, a base T of prime numbers smaller than B.

Output: a response "Prime" or "Composite" to the question: "is w prime?", and a generator g of $Z_w^*$ if w is prime.

```
1: y ← 0
2: g ← 0
3: isAGenerator ← false
4: Write w − 1 = 2^s · q_1^{u1}…q_m^{um} · v
5: for i = 1 to t do                         ▷ t is a security parameter
6:     Pick randomly a in [2, w − 2]
7:     Compute y_0 = a^{q_1^{u1-1}…q_m^{u_m-1} · v} mod w
8:     Compute y = (y_0)^{q_1…q_m} mod w
9:     if y ≠ 1 and y ≠ w − 1 then
10:        j ← 1
11:        while j ≤ s − 1 and y ≠ w − 1 do
12:            Compute y ← y^2 mod w
13:            Compute y_0 ← y_0^2 mod w
14:            if y = 1 then return (Composite)
15:            end if
16:            j ← j + 1
17:        end while
18:        if y ≠ w − 1 then return (Composite)
19:        end if
20:        if j = s − 1 then                   ▷ ⇔ a^{w−1} ≡ 1 mod w
21:            Let {q_1,…,q_m} ⊂ T be the small prime divisors of w − 1
22:            for i = 1 to m do
23:                if y_0^{∏_{j≠i} q_j} ≢ −1 mod w then  ▷ ⇔ a^{(w−1)/q_i} ≢ 1 mod w
```

The invention claimed is:

1. A method, performed by a processor of a cryptographic system, of detecting errors when cryptographically generating a message, the method including:
generating a pair of public and private cryptographic keys from a multiplicative group of integers modulo n, with n being the product of the two prime numbers p and q, said generating including performing the following for generating the two prime numbers p and q used to generate the public and private cryptographic keys:
a random drawing of candidate integers for p and q, and an test of the primality of said candidate integers including:
a first step of searching for a generator a of the multiplicative group of integers modulo p, zero being excluded,
a second step of searching for a generator b of the multiplicative group of integers modulo q, zero being excluded,
wherein the generator a or b is selected via the following process:
selecting a candidate integer w as p or q when w satisfies $w-1=2^s r$, wherein s is an integer and r is an odd integer,
selecting a number c as a candidate generator for generators a or b such that $1 \leq c \leq w-1$,
calculating the number y as $c^{2^{s-1}r}$ in order to save system resources,
comparing said number y with the number w−1, and
selecting said number c as generator of the multiplicative group of integers modulo w, zero being excluded, when y=w−1 mod w,
rejecting p or q when p or q fails the test of their primality and generating another candidate integer for p or q upon which to perform an additional test for primality;
performing an integrity test of the generated public and private cryptographic keys by encrypting a number y, as message m, using the generated public and private cryptographic keys, wherein the message satisfies: $1 \leq y \leq n-1$ with y=a mod p and γ=b mod q, and the message m is of order λ(n), wherein λ(n) is the lowest common multiple between p−1 and q−1, in order to optimize integrity verification by decreasing the error rate at which the public and private cryptographic keys are generated.

2. The method as claimed in claim 1, further including an additional step to the test of the primality to verify when $a^{(w-1)/q} \neq 1$ mod w, with $a^{w-1}=1$ mod w, said verification being effected for a set of divisors q of w−1.

3. The method as claimed in claim 2, wherein said verification is effected for a set of prime divisors q of w−1.

4. The method as claimed in claim 3, wherein, for said divisors q, the value $a^{(w-1)/q}$ is calculated by modular exponentiation.

5. The method as claimed in claim 2, wherein, for said divisors q, the value $a^{(w-1)/q}$ is calculated by modular exponentiation.

6. The method as claimed in claim 5, including an initialization of said modular exponentiation with an initial variable calculated from the factorization in prime numbers of the number w−1.

7. The method as claimed in claim 1, wherein said test of the primality is carried out in accordance with a probabilistic algorithm.

\* \* \* \* \*